(12) United States Patent
Chen

(10) Patent No.: US 11,380,494 B2
(45) Date of Patent: Jul. 5, 2022

(54) METHOD FOR ASSEMBLING KEYSWITCH DEVICE

(71) Applicant: Chicony Electronics Co., Ltd., New Taipei (TW)

(72) Inventor: Wen-Bin Chen, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 51 days.

(21) Appl. No.: 17/035,764

(22) Filed: Sep. 29, 2020

(65) Prior Publication Data

US 2021/0012979 A1 Jan. 14, 2021

Related U.S. Application Data

(62) Division of application No. 15/964,015, filed on Apr. 26, 2018, now Pat. No. 10,832,874.

(30) Foreign Application Priority Data

Dec. 21, 2017 (TW) ................................ 106145127

(51) Int. Cl.
| | |
|---|---|
| *H01H 3/12* | (2006.01) |
| *H01H 13/88* | (2006.01) |
| *G06F 1/16* | (2006.01) |
| *B29C 59/16* | (2006.01) |

(52) U.S. Cl.
CPC ............. *H01H 3/125* (2013.01); *B29C 59/16* (2013.01); *G06F 1/1632* (2013.01); *G06F 1/1669* (2013.01); *H01H 13/88* (2013.01)

(58) Field of Classification Search
CPC ...... H01H 3/125; H01H 13/88; G06F 1/1632; B29C 59/16
USPC ............................ 200/5 A, 341, 343; 29/622
See application file for complete search history.

(56) References Cited

U.S. PATENT DOCUMENTS

| | | | | |
|---|---|---|---|---|
| 4,430,531 | A * | 2/1984 | Wright ............... | H01H 13/7006 200/275 |
| 10,832,874 | B2 * | 11/2020 | Chen .................... | G06F 1/1669 |
| 2008/0237012 | A1 * | 10/2008 | Koike .................... | H01H 3/125 200/314 |
| 2011/0056817 | A1 * | 3/2011 | Wu ........................ | H01H 13/14 200/344 |
| 2016/0049266 | A1 * | 2/2016 | Stringer ................ | H01H 13/88 200/5 A |

* cited by examiner

*Primary Examiner* — Renee S Luebke
*Assistant Examiner* — Iman Malakooti
(74) *Attorney, Agent, or Firm* — CKC & Partners Co., LLC

(57) ABSTRACT

A method for assembling a keyswitch device includes: connecting a first covering portion to a surface of a first housing; connecting a second covering portion to a connection base comprising an engaging portion; rotatably engaging the engaging portion with an engaging structure; connecting the engaging structure to the first housing; and fixing a second housing to the first housing such that the first housing and the second housing constitute a recess communicating with the surface, wherein the engaging structure partially protrudes into the recess.

10 Claims, 20 Drawing Sheets

METHOD FOR ASSEMBLING KEYSWITCH DEVICE

RELATED APPLICATIONS

The present application is a Divisional Application of the U.S. application Ser. No. 15/964,015, filed Apr. 26, 2018, which claims priority to Taiwan Application Serial Number 106145127, filed Dec. 21, 2017, all of which are herein incorporated by reference in their entireties.

BACKGROUND

Technical Field

The present disclosure relates to a method for assembling a keyswitch device.

Description of Related Art

A detachable 2-in-1 laptop not only has the advantages of slimness and lightness of a tablet, but also has the usefulness of a traditional laptop when being equipped with a keyboard that is dismantlable from the tablet and rotatable to adjust a tilt angle with the tablet. To connect the keyboard to the tablet, a rotatable electrical connector is disposed on the keyboard correspondingly.

There are several designs in the market for conventional rotatable electrical connectors currently on the market generally adopt the following few designs. The first design is to dispose an electrical connector on a leather material covering a keyboard. Because the leather material is bendable and elastic, the electrical connector is rotatable. The second design is a rotatable-shaft type that adds rotatable shaft structures on both sides of a base of an electrical connector, so as to pivotally connect with respective sides of a keyboard.

However, in the aforementioned first design, the leather material may be deformed or peeled off from a keyboard surface due to pulling after a long-term rotation. An electrical connector adopting the aforementioned second design does not have a leather appearance, and the structure of the shaft can be seen through a gap between the keyboard and the electrical connector, thus affecting the product appearances.

Consequently, how to provide a keyswitch device to the aforementioned issues is one of the topics desired by the research and development of the industry.

SUMMARY

In view of the foregoing, one of the objects of the present invention is to provide a keyswitch device that can effectively prevent leather from being deformed or peeled off due to pulling and can improve the texture of the appearance of the keyswitch device.

To achieve the objective stated above, in accordance with an embodiment of the present invention, a keyswitch device includes a main body, an engaging structure, a connection base, and a flexible covering layer. The main body has a surface and a recess communicating with the surface. The engaging structure is connected to the main body and partially protrudes into the recess. The connection base includes an engaging portion. The engaging portion is rotatably engaged with the engaging structure. The flexible covering layer includes a first covering portion and a second covering portion. The first covering portion is connected to the surface. The second covering portion is connected to the connection base.

In one or more embodiments, the connection base includes a first cover body and a second cover body connected to the first cover body. The second covering portion is sandwiched between the first cover body and the second cover body, and the engaging portion is connected to the second cover body.

In one or more embodiments, the engaging portion is a pivot. The engaging structure includes a hook portion. The hook portion protrudes into the recess and has a concave surface. The pivot rotatably abuts against the concave surface.

In one or more embodiments, the engaging structure further includes a fixing portion. The fixing portion is fixed to the main body and is connected to the hook portion.

In one or more embodiments, the fixing portion is substantially parallel to the surface of the main body. The hook portion is extended from the fixing portion and is bent toward a bottom of the recess.

In one or more embodiments, the engaging portion is a pivot. The engaging structure has a shaft hole that is located inside the recess and pivotally connected to the pivot.

In one or more embodiments, the main body includes a first housing and a second housing. The first housing has the surface. The second housing is connected to the first housing and constitutes the recess with the first housing.

The engaging portion is restricted between the engaging structure and the second housing.

In one or more embodiments, the keyswitch device further includes a flexible bottom layer connected to the second housing.

In one or more embodiments, the engaging structure is disposed inside the main body.

In one or more embodiments, the first covering portion and the second covering portion are connected to or separated from each other.

To achieve the aforementioned objective, in accordance with an embodiment, a method for assembling a keyswitch device includes: connecting a first covering portion to a surface of a first housing; connecting a second covering portion to a connection base including an engaging portion; rotatably engaging the engaging portion with an engaging structure; connecting the engaging structure to the first housing; and fixing a second housing to the first housing such that the first housing and the second housing constitute a recess communicating with the surface. The engaging structure partially protrudes into the recess.

In one or more embodiments, the first housing has an opening on the surface. The method further includes: connecting a flexible covering layer to the surface to cover the opening; and cutting the flexible covering layer substantially along the opening to form the first covering portion and the second covering portion.

In one or more embodiments, the method further includes separating the first covering portion and the second covering portion.

In one or more embodiments, the first housing includes a first portion and a second portion. The first portion has the surface. The step of connecting the engaging structure to the first housing includes connecting the engaging structure to the first portion of the first housing.

In one or more embodiments, the step of connecting the engaging structure to the first portion is performed before the step of connecting the first covering portion to the surface.

In one or more embodiments, the connection base includes a first cover body and a second cover body which is connected to the engaging portion. The step of connecting the second covering portion to the connection base includes: connecting the first cover body to the second covering portion; and connecting the second cover body to the second covering portion. The connected second covering portion is sandwiched between the first cover body and the second cover body.

In one or more embodiments, the step of rotatably engaging the engaging portion with the engaging structure is performed before the step of connecting the second cover body to the second covering portion.

In one or more embodiments, the method further includes connecting a flexible bottom layer to the second housing.

In one or more embodiments, the engaging portion is a pivot. The engaging structure includes a hook portion and a fixing portion connected to each other. The hook portion has a concave surface. The step of rotatably engaging the engaging portion with the engaging structure includes rotatably engaging the engaging portion with the concave surface. The step of connecting the engaging structure to the first housing includes fixing the fixing portion to the first housing.

In one or more embodiments, the engaging portion is a pivot. The engaging structure has an inlet and a shaft hole communicating with each other. The inlet shrinks inward relative to the shaft hole. The step of rotatably engaging the engaging portion with the engaging structure includes pivotally connecting the pivot to the shaft hole through the inlet.

In sum, in the keyswitch device of the present invention, by disposing an engaging structure inside a main body for connecting with a connection base, and protruding the engaging structure into a recess of the main body, the problem of the conventional shaft structures that are exposed outward can be prevented, and the texture of the appearance of the keyswitch device can be effectively improved. In addition, by using the engaging structure, the problem that the flexible covering layer may be deformed or peeled off from the main body due to pulling caused by long-term rotation of the connection base relative to the main body can be resolved, in which the connection base is connected to the flexible covering layer.

The foregoing descriptions are provided only to explain the problem to solve, technical means to solve the problem and its efficacy, and so on, of the present invention. Specific details of the present invention will be introduced in detail in the embodiments and the related drawings below.

BRIEF DESCRIPTION OF THE DRAWINGS

To make the objectives, features, advantages, and examples of the present invention, including those mentioned above and others, more comprehensible, descriptions of the accompanying drawings are provided as follows.

DETAILED DESCRIPTION

Figure 1:
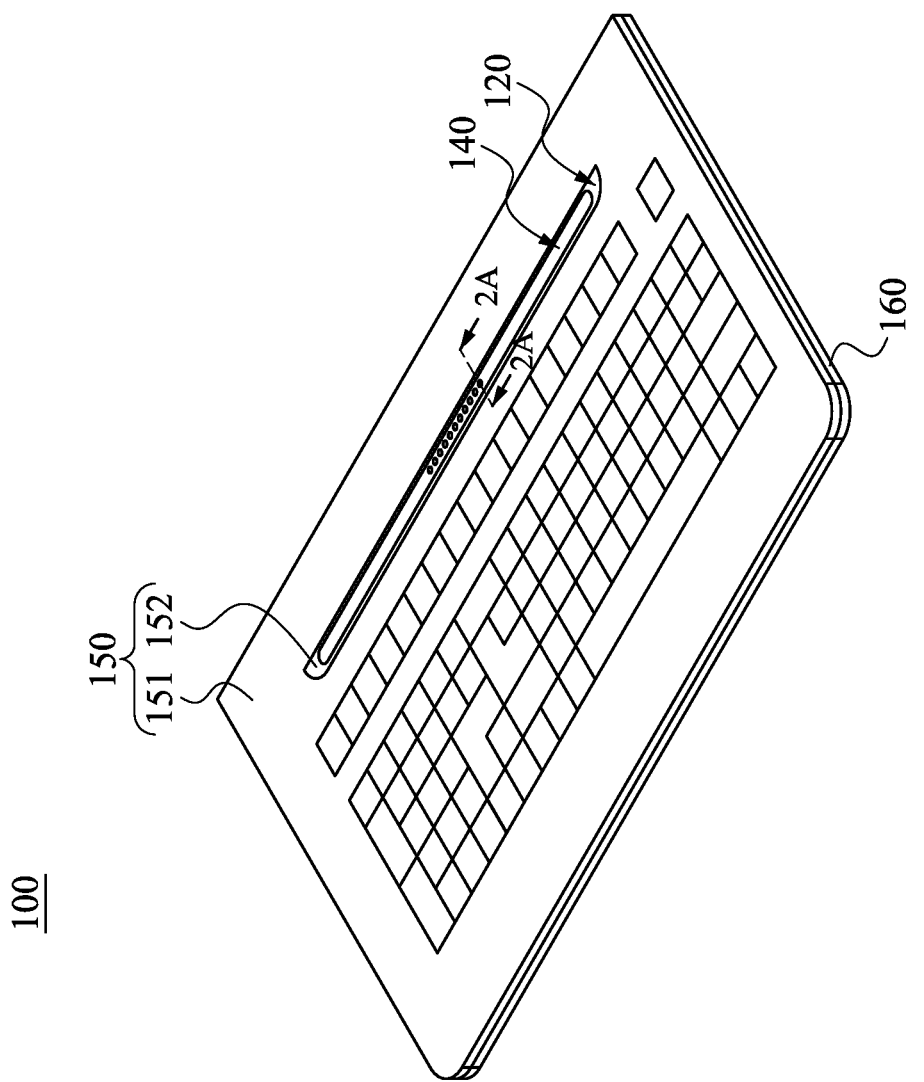
FIG. 1 illustrates a partial perspective view of a keyswitch device in accordance with an embodiment of the present invention.

Various embodiments of the present invention, examples of which are illustrated in the accompanying drawings, will be disclosed below. For the sake of clarity, various practical details will be explained in the following descriptions. However, it should be understood that these practical details should not be used to limit the present invention. In other words, these practical details are unnecessary in certain embodiments of the present invention. Moreover, to simplify the drawings, some well-known structures or elements will be illustrated schematically in the drawings.

Figure 2A:
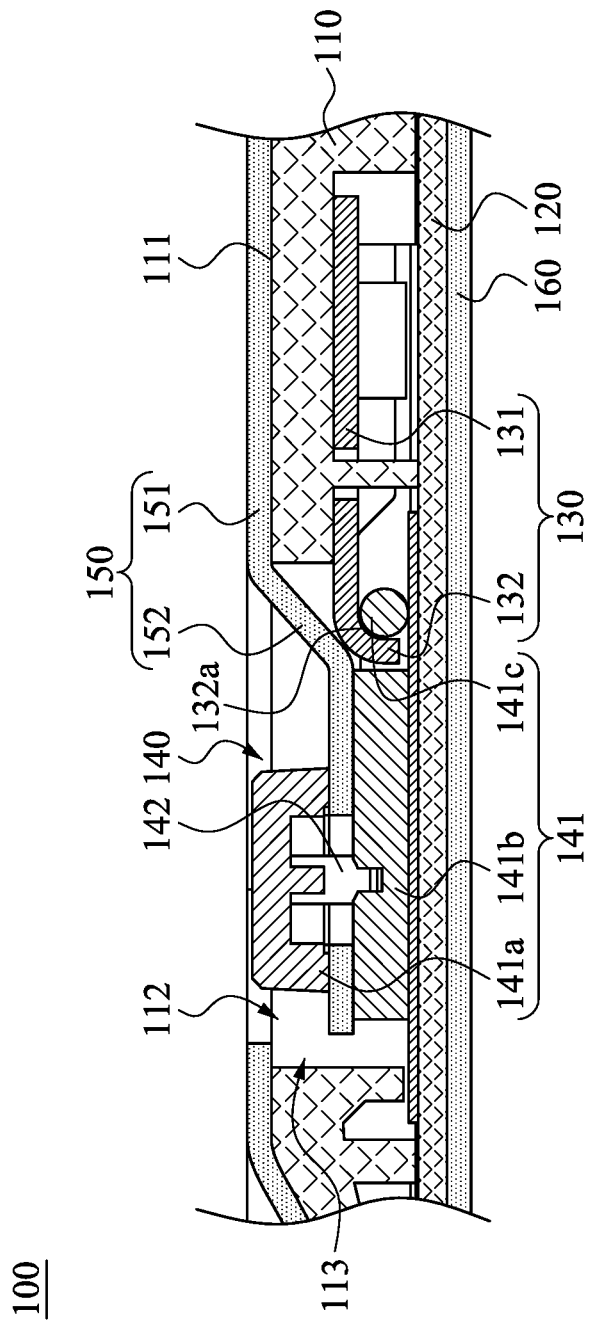
FIG. 2A illustrates a partial cross-sectional view of the keyswitch device taken along line 2A-2A shown in FIG. 1, in which a connection base is located inside a recess.
Figure 2B:
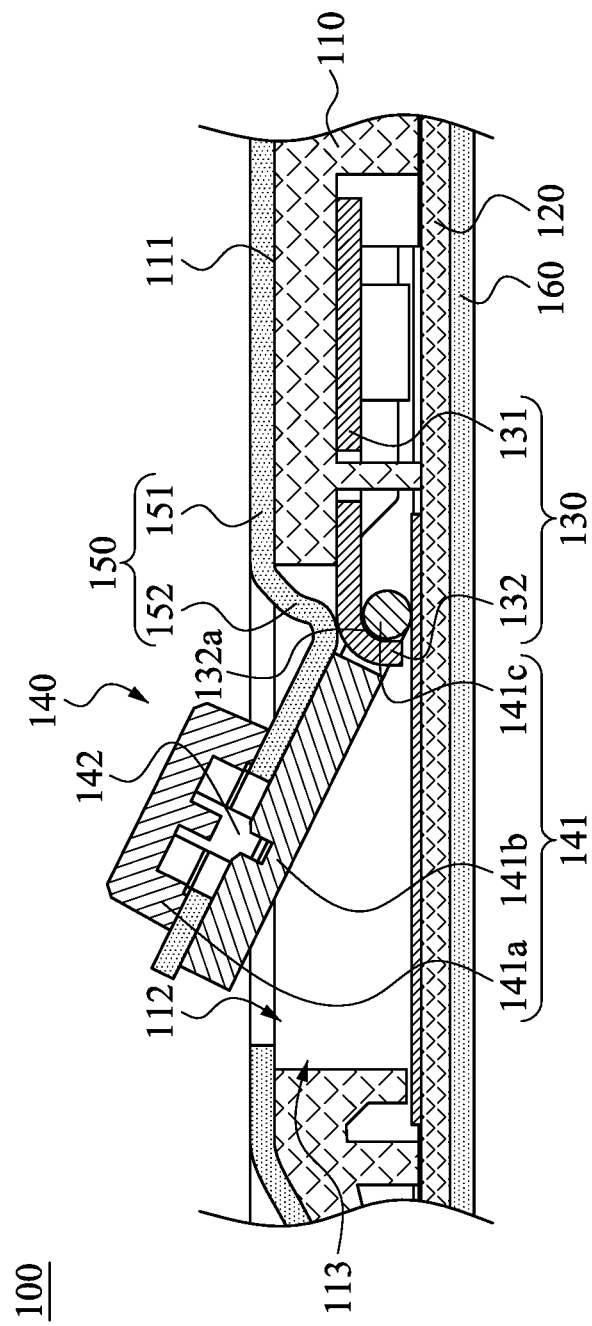
FIG. 2B is a schematic diagram of the structure shown in FIG. 2A after rotation, in which the connection base partially protrudes out of the recess.

Please refer to FIG. 1 to FIG. 2B. FIG. 1 illustrates a partial perspective view of a keyswitch device 100 in accordance with an embodiment of the present invention. FIG. 2A illustrates a partial cross-sectional view of the keyswitch device taken along line 2A-2A shown in FIG. 1. In FIG. 2A, a connection base 141 is located inside a recess 113. FIG. 2B is a schematic diagram of the structure shown in FIG. 2A after rotation. In FIG. 2B, the connection base 141 partially protrudes out of the recess 113.

As shown in FIG. 1 to FIG. 2B, in the present embodiment, the keyswitch device 100 includes a main body, an engaging structure 130, an electrical connector 140, a flexible covering layer 150, and a flexible bottom layer 160. The main body includes a first housing 110 and a second housing 120. The main body has a surface 111, an opening 112, and a recess 113 communicating with the surface 111 through the opening 112. An engaging structure 130 is connected to the main body and partially protrudes into the recess 113. The electrical connector 140 includes a connection base 141, and the connection base 141 includes an engaging portion 141c rotatably engaged with the engaging structure 130. The flexible covering layer includes a first covering portion 151 and a second covering portion 152. The first covering portion 151 is connected to the surface 111, and the second covering portion 152 is connected to the connection base 141. The flexible bottom layer 160 is connected with and covers the side of the second housing 120 located away from the first housing 110.

In the present embodiment, the flexible covering layer 150 and the flexible bottom layer 160 may be a leather layer, a leather case layer, or a soft layer, but the present invention is not limited in this regard.

In the present embodiment, hot-press bonding, hot melting, gluing, and other fixing method may be adopted to connect the flexible covering layer 150 to the main body and the connection base 141, and to connect the flexible bottom layer 160 to the main body.

In some embodiments, the first housing 110 has the opening 112 and the surface 111. The second housing 120 is connected to the first housing 110, and the first housing 110 and the second housing 120 constitutes the recess 113.

Furthermore, as shown in FIG. 2A and FIG. 2B, the connection base 141 includes a first cover body 141a and a second cover body 141b connected to the first cover body 141a. The second covering portion 152 is sandwiched between the first cover body 141a and the second cover body 141b. The engaging portion 141c is connected to the second cover body 141b. This structural configuration can effectively reduce the area of the connection base 141 exposed out of the flexible covering layer 150 (i.e., reduce the area of the connection base 141 that is not covered by the flexible covering layer 150). As a result, compared to the conventional electrical connectors that are not covered by leathers, the keyswitch device 100 of the present embodiment can effectively improve the texture of the product appearance.

In some embodiments, the engaging portion 141c is a pivot, as show in FIG. 2A and FIG. 2B. The engaging structure 130 includes a fixing portion 131 and a hook portion 132. The fixing portion 131 is fixed to the main body and connected to the hook portion 132. In some embodiments, the fixing portion 131 of the engaging structure 130 is fixed to the first housing 110 of the main body and is located between the first housing 110 and the second housing 120. The engaging structure 130 may be fixed to the first housing 110 by bonding or gluing, or by fitting with hooking, locking, interfering, or fixing components, but the present invention is not limited in this regard. The hook portion 132, which has a concave surface 132a is extended from the fixing portion 131, and protrudes into the recess 113. The pivot rotatably abuts against the concave surface 132a.

In some embodiments, the connection interface of the first covering portion 151 and the second covering portion 152 is substantially located at an edge of the opening 112 of the first housing 110, as shown in FIG. 2A and FIG. 2B, but the present invention is not limited in this regard. In addition, the hook portion 132 of the engaging structure 130 is substantially aligned with the edge of the opening 112. With the structural configuration stated above, the connection base 141 can rotate relative to the edge of the opening 112, while enabling the second covering portion 152 to rotate relative to the first covering portion 151.

In some embodiments, the fixing portion 131 is substantially parallel to the surface 111 of the first housing 110 of the main body. The hook portion 132 is extended from the fixing portion 131 and is bent toward a bottom of the recess 113. With this structural configuration, the engaging portion 141c of the connection base 141 can be stably restricted between the engaging structure 130 and the second housing 120, thereby effectively preventing the engaging portion 141c from being detached from the engaging structure 130, in which the detachment of the engaging portion 141c from the engaging structure 130 may cause the detachment of the connection base 141 from the recess 113.

Figure 3A:
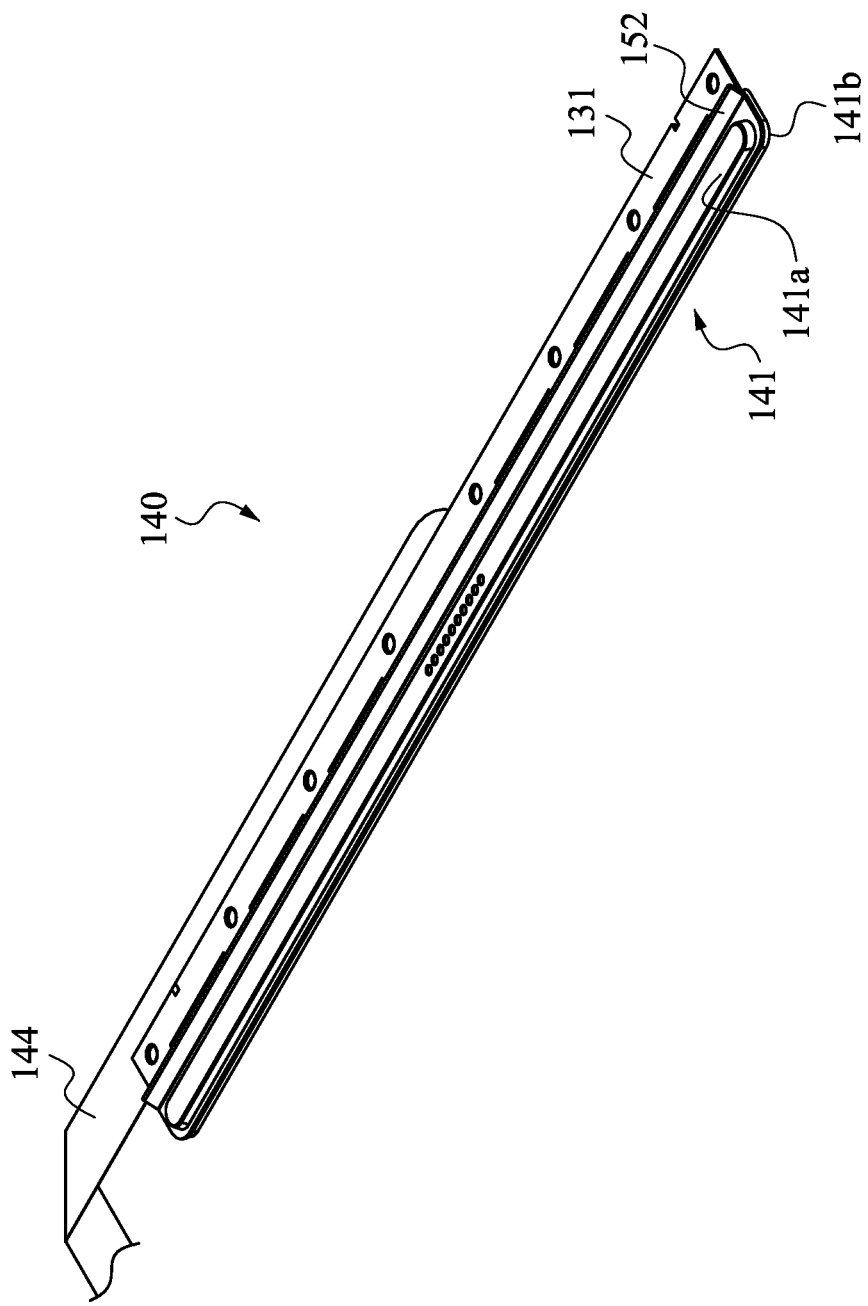
FIG. 3A illustrates a perspective view of some elements of a keyswitch device in accordance with an embodiment of the present invention.
Figure 3B:
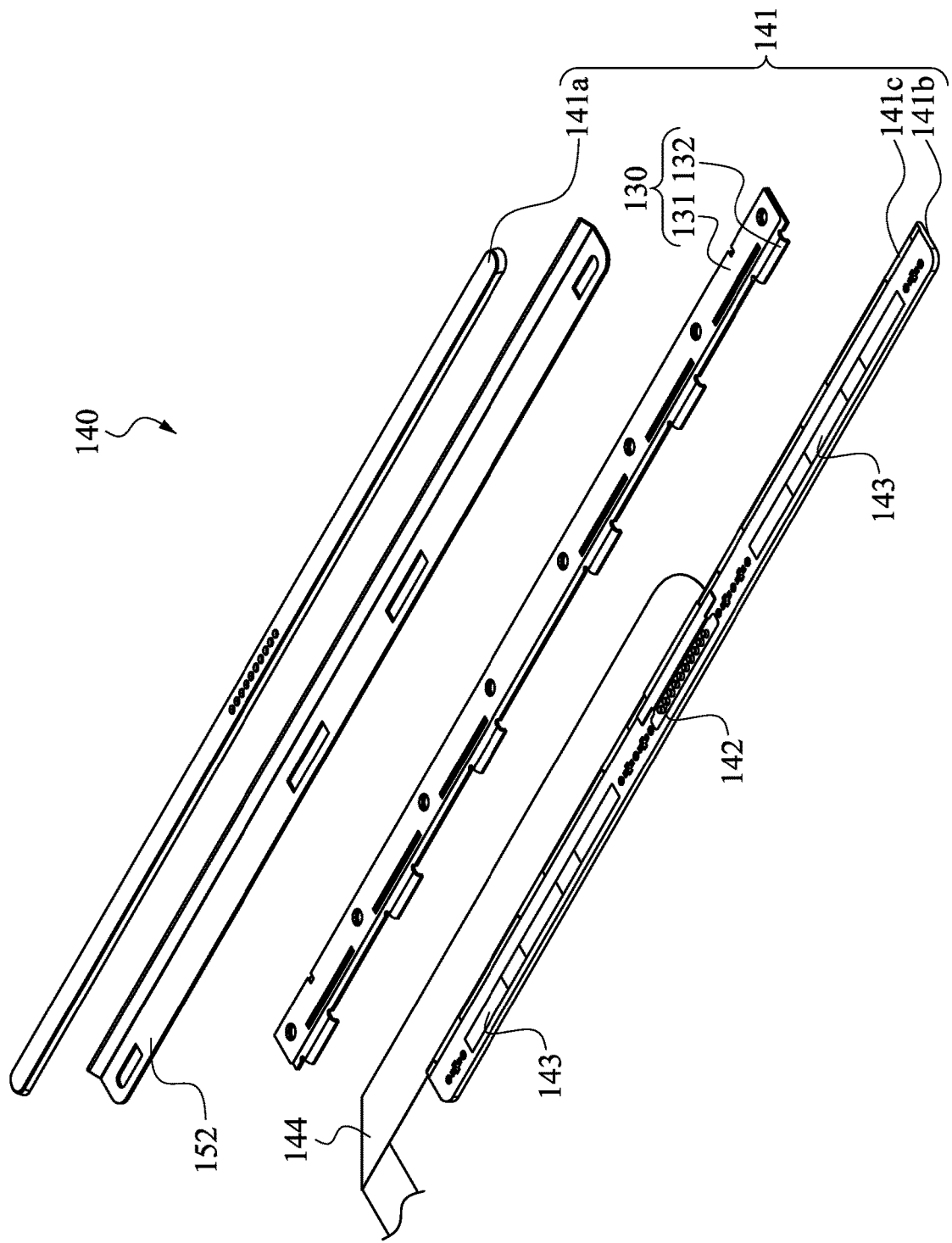
FIG. 3B is an exploded view of the elements shown in FIG. 3A.

Please refer to FIG. 3A and FIG. 3B. FIG. 3A illustrates a perspective view of some elements of a keyswitch device in accordance with an embodiment of the present invention. FIG. 3B is an exploded view of the elements of the keyswitch device shown in FIG. 3A.

As shown in FIG. 3A and FIG. 3B, in the present embodiment, the electrical connector 140 further includes an electrical connection module 142, magnetic members 143, and a transmission route 144. The electrical connection module 142 and the magnetic members 143 are disposed inside the connection base 141 (i.e., accommodated in the space between the first cover body 141a and the second cover body 141b), and the electrical connection module 142 passes through the second covering portion 152 of the flexible covering layer 150. The electrical connection module 142 is partially exposed out of the first cover body 141a and is configured to be electrically connected with an external electronic device (not shown, such as a tablet). The two magnetic members 143 are disposed on both sides of the electrical connection module 142, and are configured to attract magnets disposed inside the external electronic device (not shown), thereby enabling the external electronic device to stably abut against the connection base 141, thus establishing a more stable electrical connection between the electrical connection module 142 and the external electronic device. The transmission route 144 electrically connects the electrical connection module 142 and the electronic components disposed inside the main body (such as a processor).

In some embodiments, the electrical connection module 142 is a pogo pin connector, but the present invention is not limited in this regard. In some embodiments, the transmission route 144 is disposed on a flexible circuit board, but the present invention is not limited in this regard.

It is noted that, in some embodiments, the connection base 141 of the electrical connector 140 includes engaging portions 141c, and the engaging structure 130 correspondingly includes hook portions 132 that can be respectively engaged with the engaging portions 141c, as shown in FIG. 3B. In other words, the engaging portions 141c and the hook portions 132 can form plural engaging combinations. In addition, these engaging combinations are uniformly and substantially equidistantly distributed along the interface between the second cover body 141b and the engaging structure 130. With this structural configuration, the force exerted on the second cover body 141b and the engaging structure 130 can be uniformly shared when the second cover body 141b and the engaging structure 130 are rotated relative to each other, thereby enhancing the stability of the pivotal connection between the second cover body 141b and the engaging structure 130. Thus, deformation at the interface between the second cover body 141b and the engaging structure 130 due to pulling can be effectively prevented, thereby solving the problem that the leather of the second covering portion 152 is peeled off.

Figure 4:
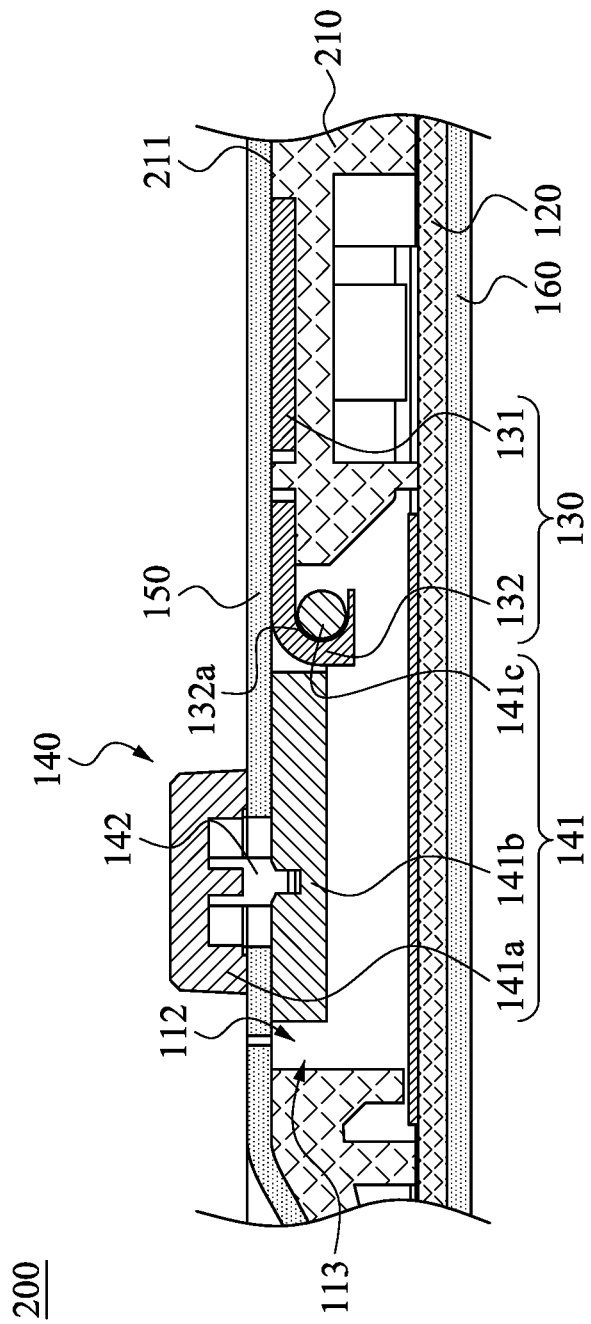
FIG. 4 illustrates a partial cross-sectional view of a keyswitch device in accordance with another embodiment of the present invention.

In some embodiments, the engaging structure 130 is disposed inside the main body, as show in FIG. 2A and FIG. 2B, but the present invention is not limited in this regard. Please refer to FIG. 4, which illustrates a partial cross-sectional view of a keyswitch device 200 in accordance with another embodiment of the present invention. In the present embodiment, as shown in FIG. 4, the keyswitch device 200 includes a main body, an engaging structure 130, an electrical connector 140, and a flexible covering layer 150. The engaging structure 130, the electrical connector 140, and the flexible covering layer 150 in the present embodiment are the same as those of the embodiment shown in FIG. 2A. Therefore, references can be made to the foregoing related descriptions, and details are not described herein again. It should be noted that differences between the present embodiment and the embodiment shown in FIG. 2A are that the structure of the first housing 110 of the main body and the location of the engaging structure 130 have been modified.

In the present embodiment, the engaging structure 130 is attached to a surface 211 of a first housing 210 that is located away from the second housing 120. In the present embodiment, the top surface of the engaging structure 130 and the surface 211 of the first housing 210 are coplanar, but the present invention is not limited in this regard. In practical applications, a step may exist between the top surface of the engaging structure 130 and the surface 211 of the first housing 210.

Figure 5:
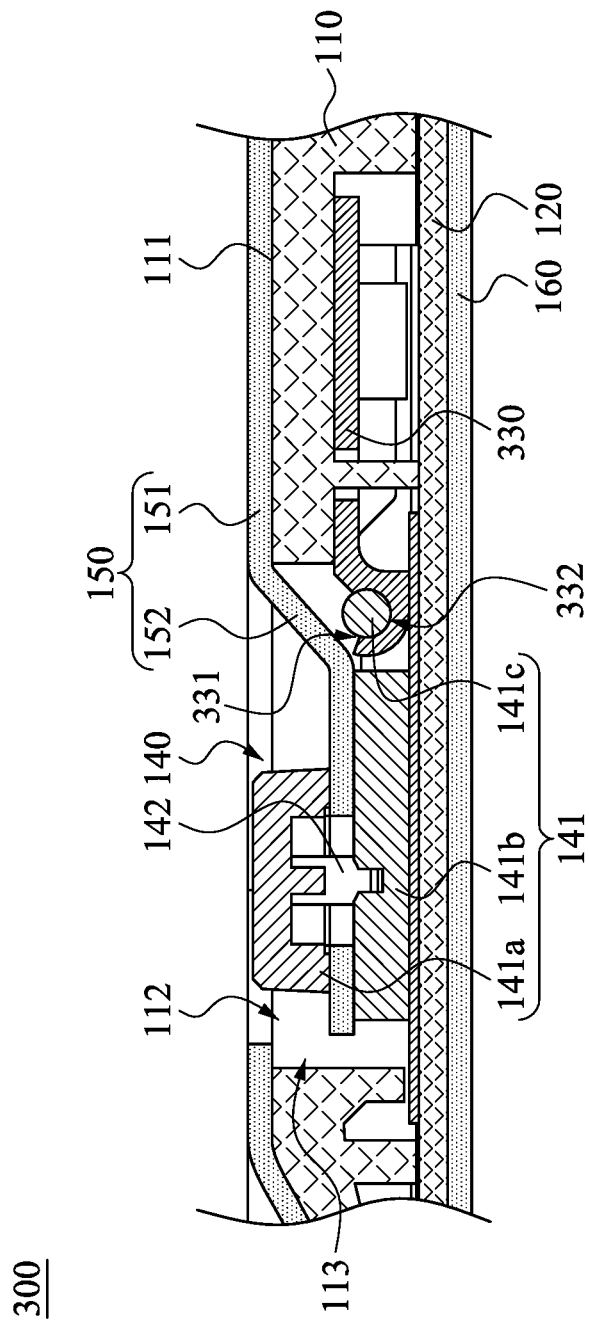
FIG. 5 illustrates a partial cross-sectional view of a keyswitch device in accordance with another embodiment of the present invention.

Please refer to FIG. 5, which illustrates a partial cross-sectional view of a keyswitch device 300 in accordance with another embodiment of the present invention. In the present embodiment, the keyswitch device 300 includes a main body, an engaging structure 330, an electrical connector 140, and a flexible covering layer 150. The main body, the electrical connector 140, and the flexible covering layer 150 in the present embodiment are the same as those of the embodiment shown in FIG. 2A. Therefore, references can be made to the foregoing related descriptions, and details are not described herein again. It should be noted that a difference between the present embodiment and the embodiment shown in FIG. 2A is that the engaging structure 130 has been modified.

In the present embodiment, the engaging structure 330 has an inlet 331 and a shaft hole 332 communicating with each other. The shaft hole 332 is located inside the recess 113 and is pivotally connected with the pivot. The inlet 331 shrinks inward relative to the shaft hole 332. In other words, in the cross-sectional view shown in FIG. 5, a shape of the combination of the inlet 331 and the shaft hole 332 is similar to a shape of a droplet-shaped hole. Consequently, an assembler may press the pivot to enter the shaft hole 332 through the inlet 331, so as to complete the assembly of the keyswitch device, in which the shrinking inlet 331 can prevent the pivot from escaping from the shaft hole 332.

In some embodiments, the inlet 331 of the engaging structure 330 is located on the side of the engaging structure 330 that faces toward the first housing 110 and faces away from the second housing 120, so as to facilitate the connection base 141 into the recess 113 through the opening 112 for assembly, but the present invention is not limited in this regard. In some other embodiments, the inlet 331 of the engaging structure 330 may also be located on the side of the engaging structure 330 that facies toward the second housing 120 and faces away from the first housing 110, so as to stably restrict the pivot between the engaging structure 330 and the second housing 120, thereby effectively preventing the pivot from being detached from the engaging structure 330, in which the detachment of the pivot from the engaging structure 330 may cause the detachment of the connection base 141 from the recess 113.

Please refer to FIG. 6A to FIG. 6E, which are schematic diagrams showing a method for assembling a keyswitch device at various assembly stages in accordance with an embodiment of the present invention. As shown in FIG. 6A to FIG. 6E, with references to FIG. 2A and FIG. 2B, in the present embodiment, the method can include steps S101 to S107.

Figure 6A:
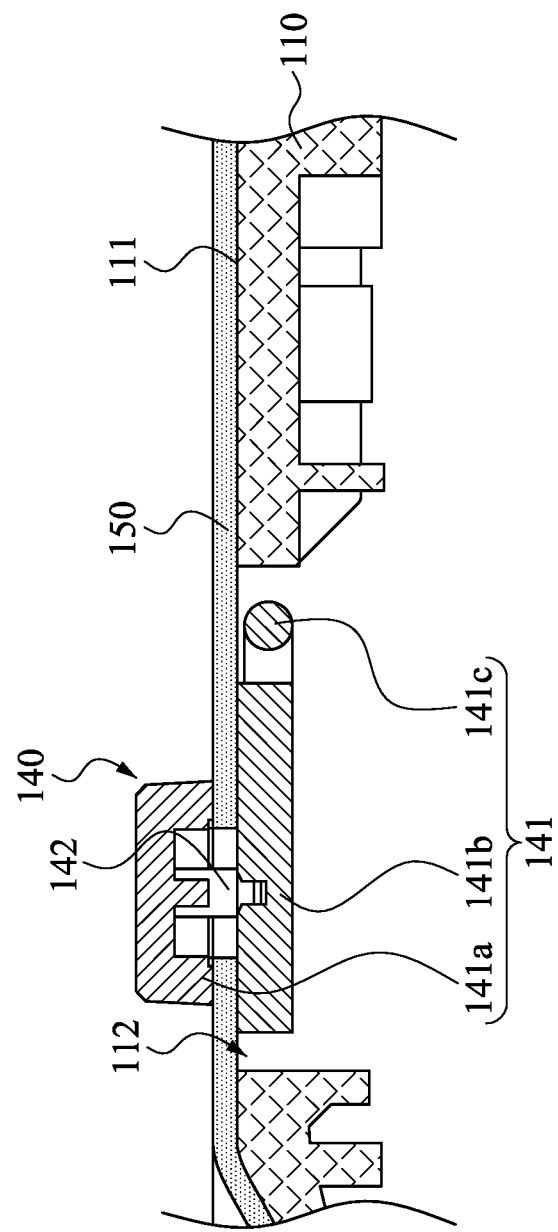
FIG. 6A to FIG. 6E are schematic diagrams showing a method for assembling a keyswitch device at various assembly stages in accordance with an embodiment of the present invention.

In step S101, a first covering portion 151 is connected to a surface 111 of a first housing 110 (referring to FIG. 6A).

In step S102, a second covering portion 152 is connected to a connection base 141, in which the connection base 141 includes an engaging portion 141c (referring to FIG. 6A). In some embodiments, step S102 may be performed before step S101.

In some embodiments, the connection base 141 includes a first cover body 141a and a second cover body 141b connected with the engaging portion 141c. The step of connecting the second covering portion 152 to the connection base 141 (i.e., S102) includes steps S102a and S102b.

In step S102a, the first cover body 141a is connected to the second covering portion 152.

In step S102b, the second cover body 141b is connected to the second covering portion 152. As a result, the connected second covering portion 152 is sandwiched between the first cover body 141a and the second cover body 141b.

In some embodiments, the step of connecting the second cover body 141b to the second covering portion 152 (i.e., S102b) can be performed before the step of connecting the first cover body 141a to the second covering portion 152 (i.e., S102a).

In some embodiments, the first housing 110 has an opening 112 on the surface 111. The method further includes steps S103a and S103b.

In step S103a, a flexible covering layer 150 is connected to the surface 111 to cover the opening 112 (referring to FIG. 6A). In some embodiments, performing step S103a means that step S101 is performed.

Figure 6B:
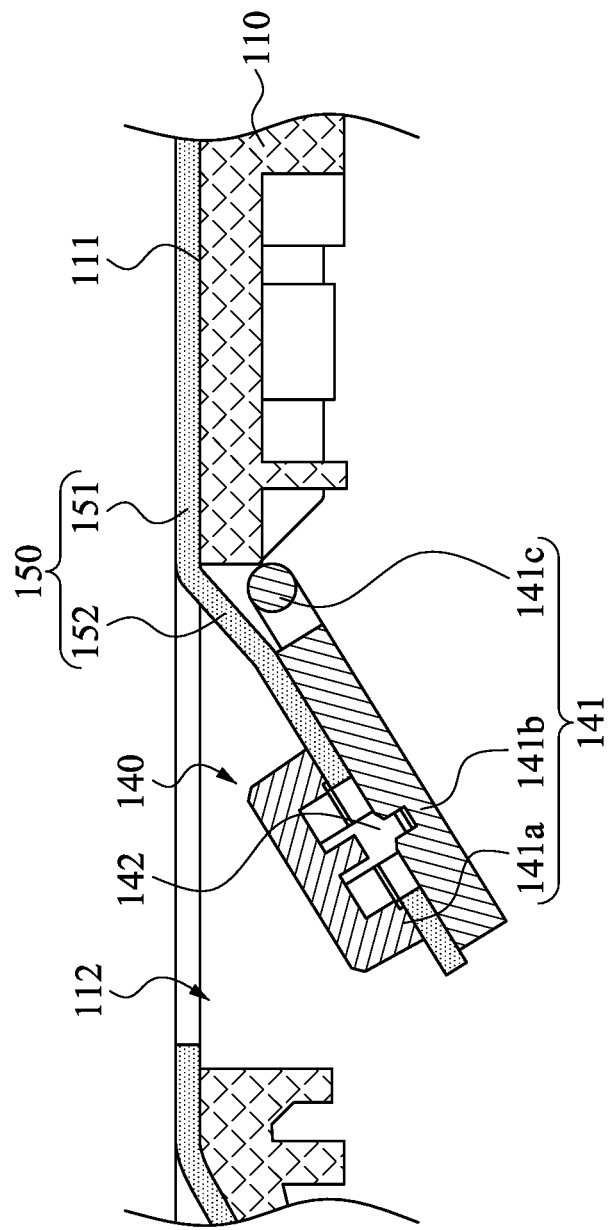

In step S103b, the flexible covering layer 150 is substantially cut along the opening 112 to form the first covering portion 151 and the second covering portion 152 (referring to FIG. 6B).

Figure 6C:
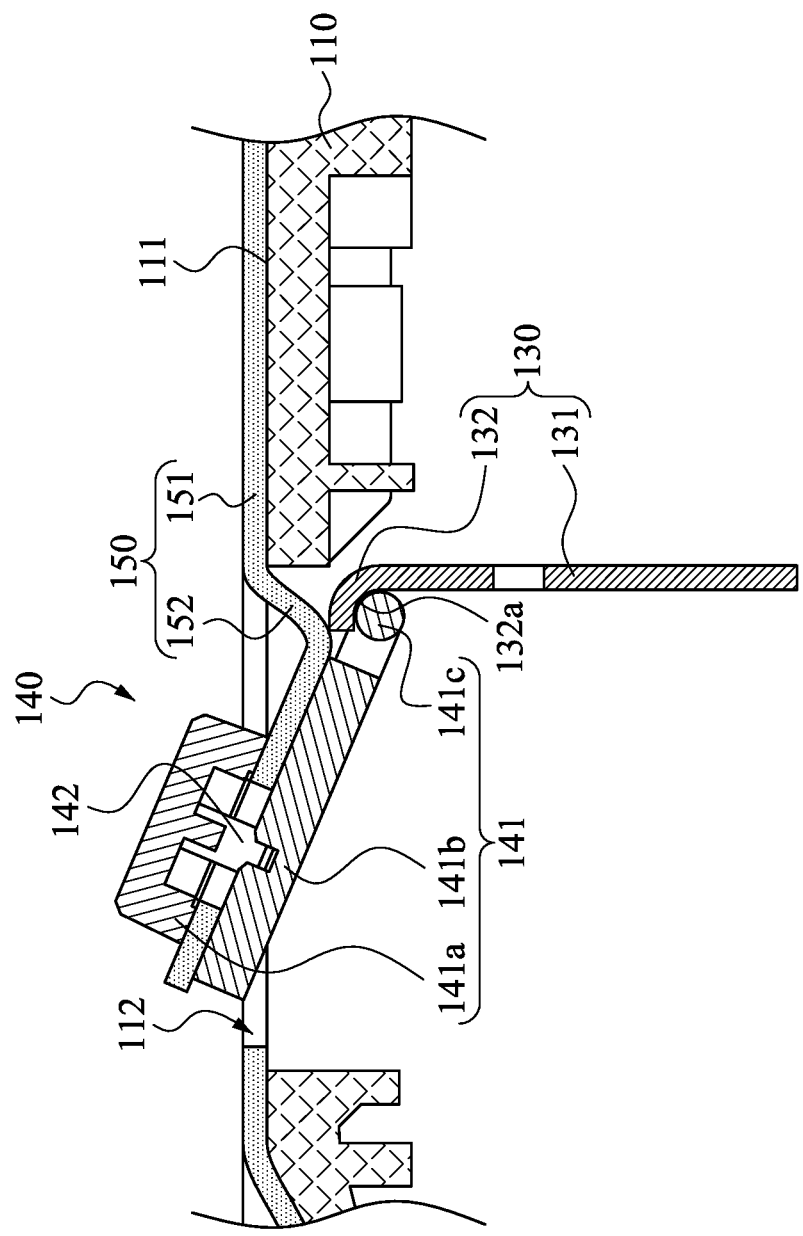

In step S104, the engaging portion 141c is rotatably engaged with the engaging structure 130 (referring to FIG. 6C).

Figure 6D:
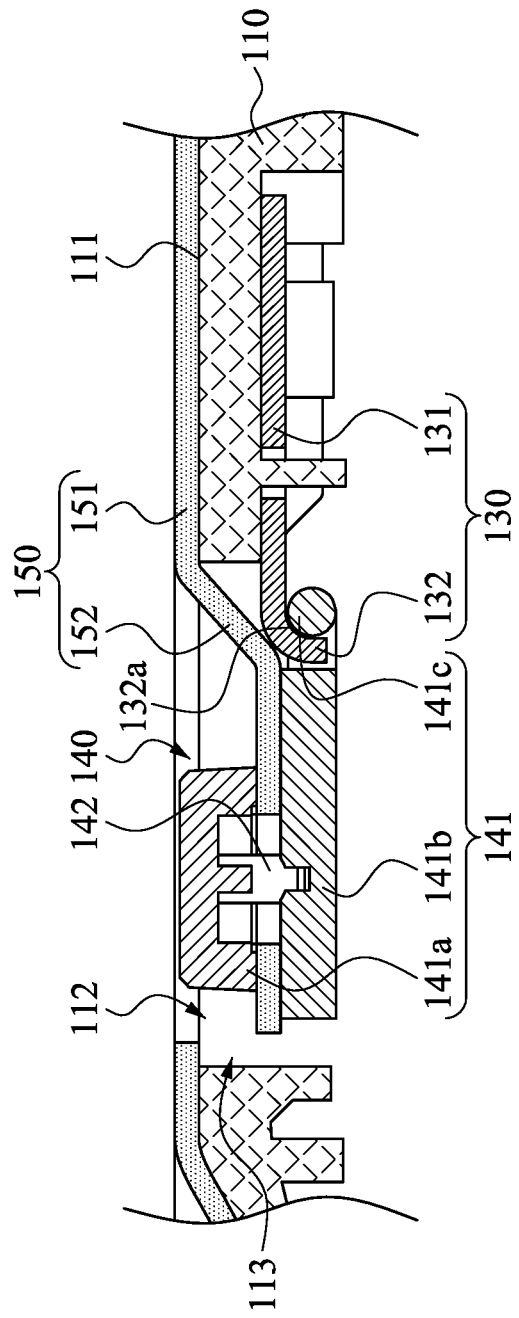

In step S105, the engaging structure 130 is connected to the first housing 110 (referring to FIG. 6D).

In some embodiments, the engaging portion 141c is a pivot. The engaging structure 130 includes a hook portion 132 and a fixing portion 131 connected to each other. The hook portion 132 has a concave surface 132a. The step of rotatably engaging the engaging portion 141c with the engaging structure 130 (i.e., S104) includes step S104a. The step of connecting the engaging structure 130 to the first housing 110 (i.e., S105) includes step S105a.

In step S104a, the engaging portion 141c is rotatably abutted against the concave surface 132a.

In step S105a, the fixing portion 131 is fixed to the first housing 110.

It should be noted that, in the present embodiment, the engaging structure 130 may be fixed to the first housing 110 by bonding or gluing, or by fitting with hooking, locking, interfering, or fixing components, but the present invention is not limited in this regard.

In some other embodiments, with reference to FIG. 5, the engaging portion 141c is a pivot. An engaging structure 330 has an inlet 331 and a shaft hole 332 communicating with each other. The inlet 331 shrinks inward relative to the shaft hole 332. The step of rotatably engaging the engaging portion 141c with the engaging structure 330 (i.e., S104) includes step S104b.

In step S104b, the pivot is pivotally connected to the shaft hole 332 through the inlet 331.

Figure 6E:
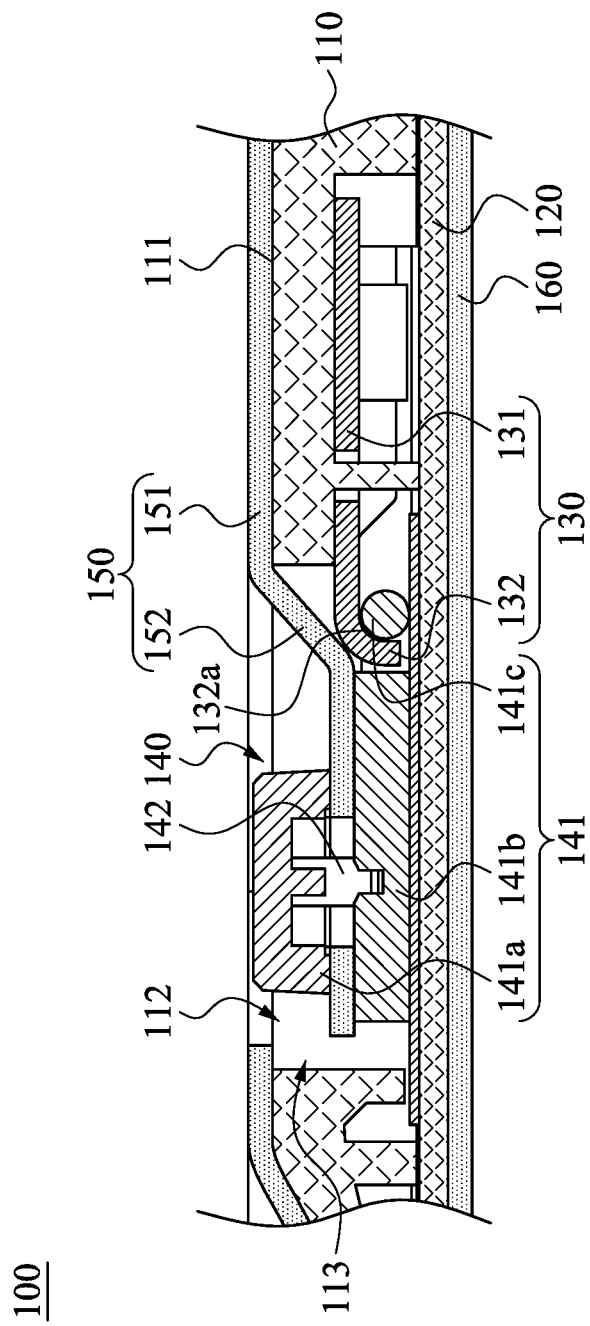

In step S106, a second housing 120 is fixed to the first housing 110, such that the first housing 110 and the second housing 120 constitute a recess 113 communicating with the surface 111 (referring to FIG. 6E). The engaging structure 130 partially protrudes into the recess 113.

In step S107, a flexible bottom layer 160 is connected to and covers the side of the second housing 120 located away from the first housing 110 (referring to FIG. 6E).

It should be noted that, in the present embodiment, hot-press bonding, hot melting, gluing, and other fixing methods may be adopted to connect the flexible covering layer 150 to the first housing 110 and the connection base 141, and to connect the flexible bottom layer 160 to the second housing 120.

The keyswitch device 100 as shown in FIG. 2A and FIG. 2B can be obtained by performing steps S101 to S107 stated above.

Figure 6F:
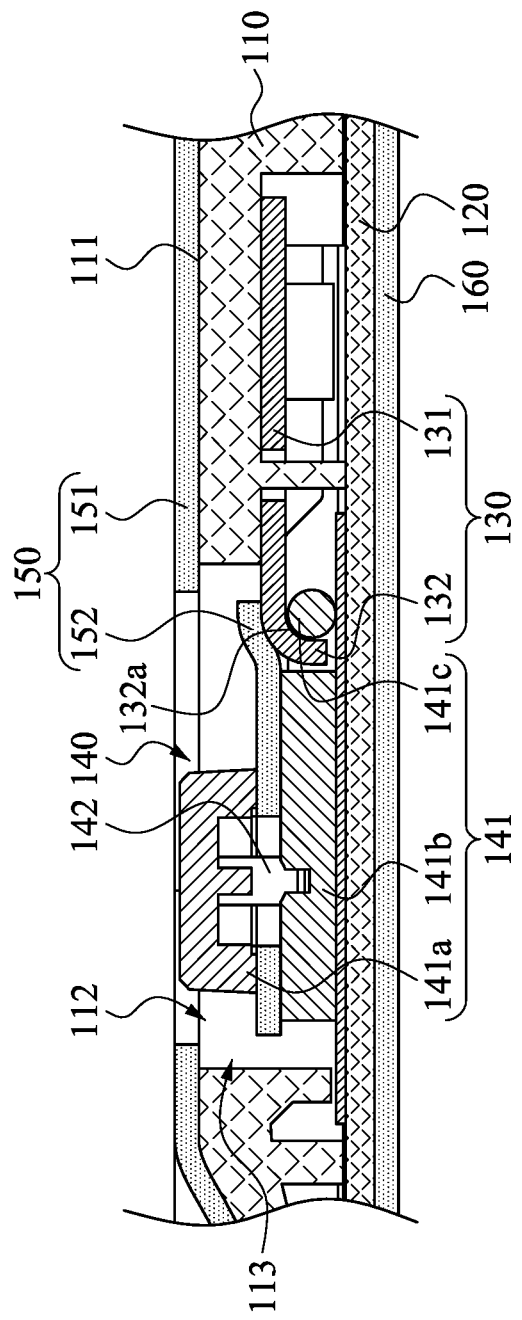
FIG. 6F illustrates a schematic diagram showing a method for assembling a keyswitch device at one of assembly stages in accordance with another embodiment of the present invention.

Please refer to FIG. 6F, which is a schematic diagram showing a method for assembling a keyswitch device at one of assembly stages in accordance with another embodiment of the present invention. Compared to the method shown in FIG. 6A to FIG. 6E, the method of the present embodiment may further include step S108.

In step S108, the first covering portion 151 and the second covering portion 152 are separated. In some embodiments, S108 can be performed before or after any one of the steps S101 to S107.

Figure 7:
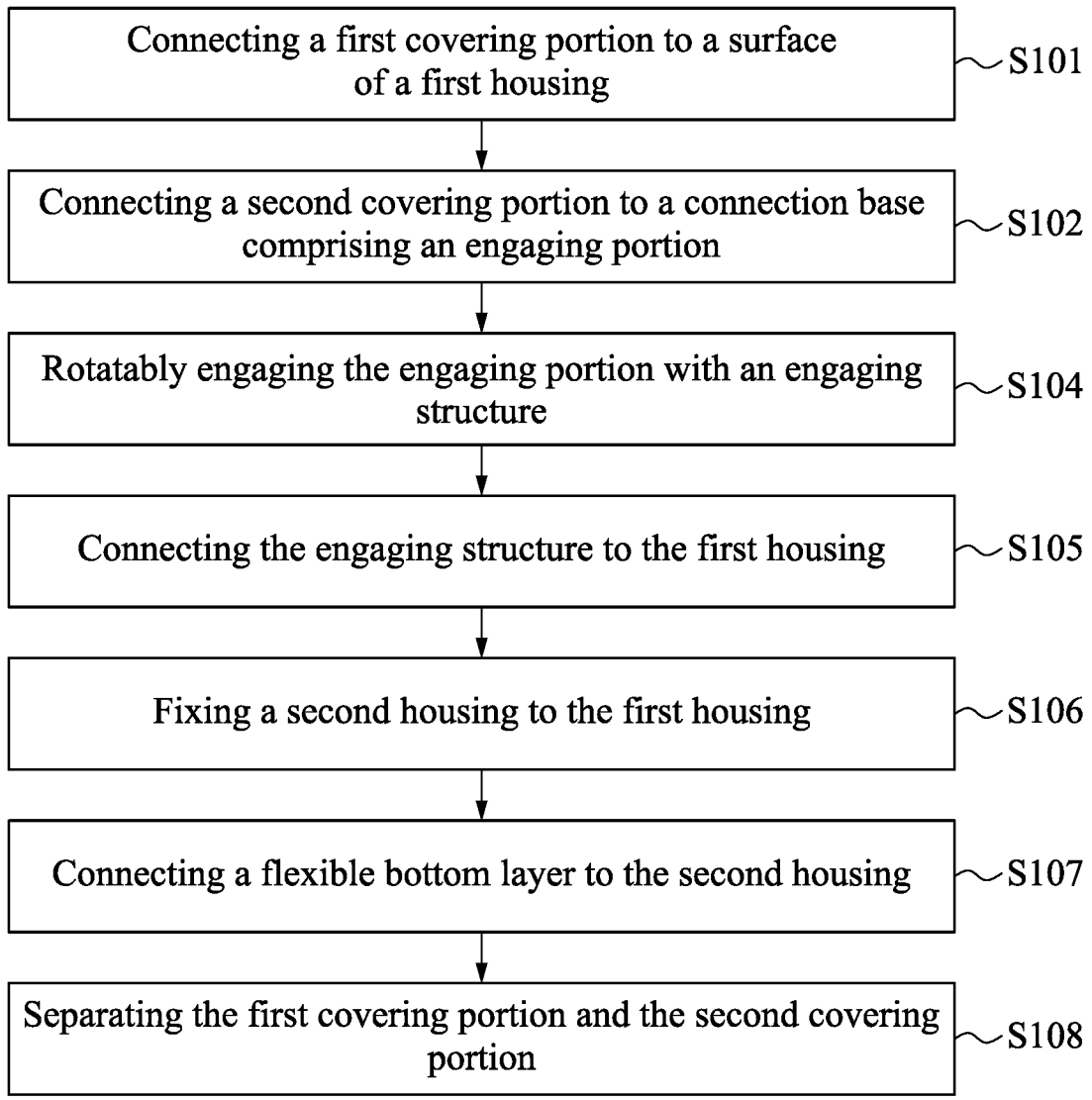
FIG. 7 illustrates a flow chart of a method for assembling a keyswitch device in accordance with an embodiment of the present invention.

FIG. 7 illustrates a flow chart of a method for assembling a keyswitch device in accordance with an embodiment of the present invention. The method shown in FIG. 7 can be more easily understood by referring back to FIG. 6A to FIG. 6F.

Please refer to FIG. 8A to FIG. 8E, which are schematic diagrams showing a method for assembling a keyswitch device at various assembly stages in accordance with another embodiment of the present invention. As shown in FIG. 8A to FIG. 8E, in the present embodiment, the method may include steps S201 to S207. It should be noted that, in the present embodiment, a first housing 410 includes a first portion 410a and a second portion 410b. The first portion 410a has a surface 410a1. The first portion 410a and the second portion 410b constitute an opening 412.

Figure 8A:
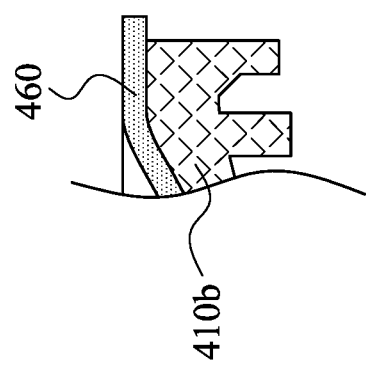
FIG. 8A to FIG. 8E are schematic diagrams showing a method for assembling a keyswitch device at various assembly stages in accordance with another embodiment of the present invention.

In step S201, a flexible covering layer 460 is connected to a surface of the second portion 410b (referring to FIG. 8A).

Figure 8B:
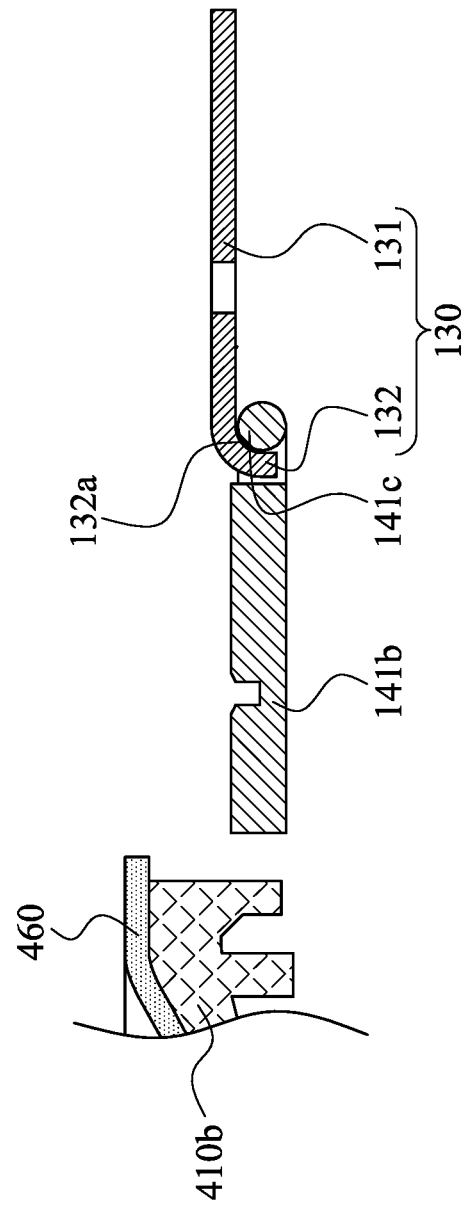

In step S202, an engaging portion 141c is rotatably engaged with an engaging structure 130 (referring to FIG. 8B).

Figure 8C:
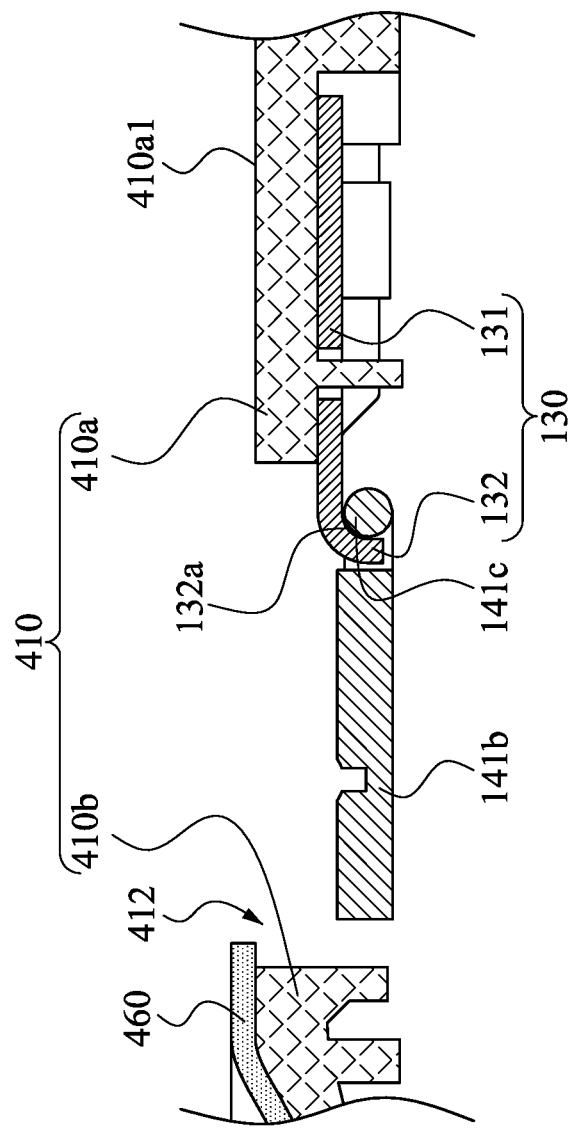

In step S203, the engaging structure 130 is connected to the first portion 410a (referring to FIG. 8C).

It should be noted that, in the present embodiment, the engaging structure 130 may be fixed to the first portion 410a by bonding or gluing, or by fitting with hooking, locking, interfering, or fixing components, but the present invention is not limited in this regard.

Figure 8D:
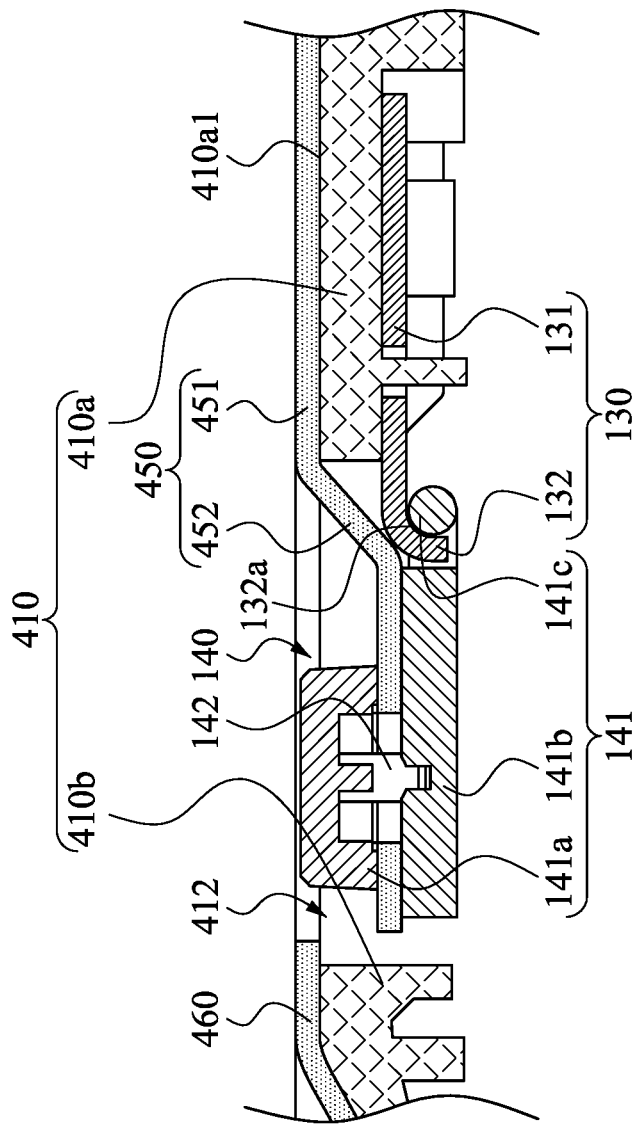

In step S204, a first covering portion 451 is connected to the surface 410a1 of the first portion 410a (please refer to FIG. 8D).

In step S205, a second covering portion 452 is connected to a connection base 141 (referring to FIG. 8D). In some embodiments, the connection base 141 includes a first cover body 141a and a second cover body 141b, connected to the engaging portion 141c. The step of connecting the second covering portion 452 to the connection base 141 (i.e., step S205) may further include steps S205a and S205b.

In step S205a, the first cover body 141a is connected to the second covering portion 452.

In step S205b, the second cover body 141b is connected to the second covering portion 452. The connected second covering portion 452 is sandwiched between the first cover body 141a and the second cover body 141b.

In some embodiments, the step of connecting the second cover body 141b to the second covering portion 452 (i.e., S205b) is performed before the step of connecting the first cover body 141a to the second covering portion 452 (i.e., S205a).

In some embodiments, the step of rotatably engaging the engaging portion 141c with the engaging structure 130 (i.e., S202) is performed after the step of connecting the second cover body 141b to the second covering portion 452 (i.e., S205b).

Figure 8E:
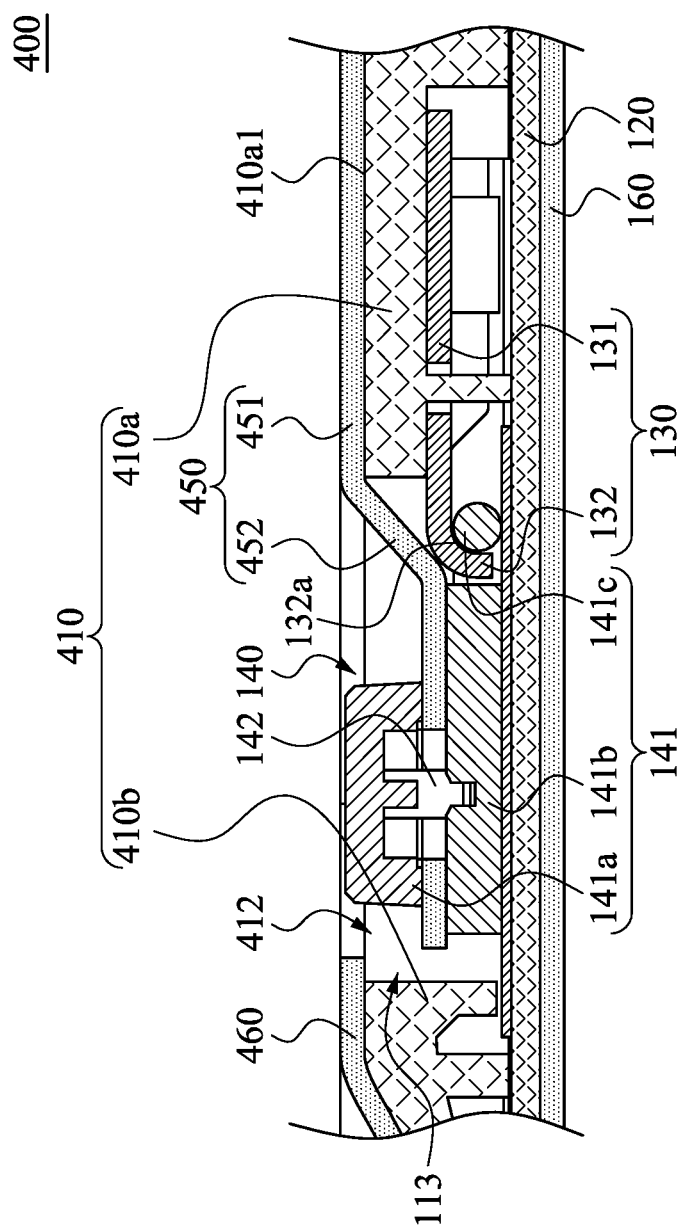

In step S206, a second housing 120 is fixed to the first housing 410, such that the first housing 410 and the second housing 120 constitute a recess 113 communicating with the surface 410a1 (referring to FIG. 8E). The engaging structure 130 partially protrudes into the recess 113.

In step S207, a flexible bottom layer 160 is connected to and covers the side of the second housing 120 located away from the first housing 410 (referring to FIG. 8E).

In some embodiments, as shown in FIG. 8A and FIG. 8B, step S201 is performed after step S202, but the present invention is not limited in this regard. In practical applications, S201 can be performed before or after any one of the steps S202 to S207.

It is noted that, in the present embodiment, hot-press bonding, hot melting, gluing, and other fixing methods may be adopted to connect the flexible covering layer 450 to the first portion 410a and the connection base 141, to connect the flexible covering layer 450 to the second portion 410b, and to connect the flexible bottom layer 160 to the second housing 120.

Figure 9:
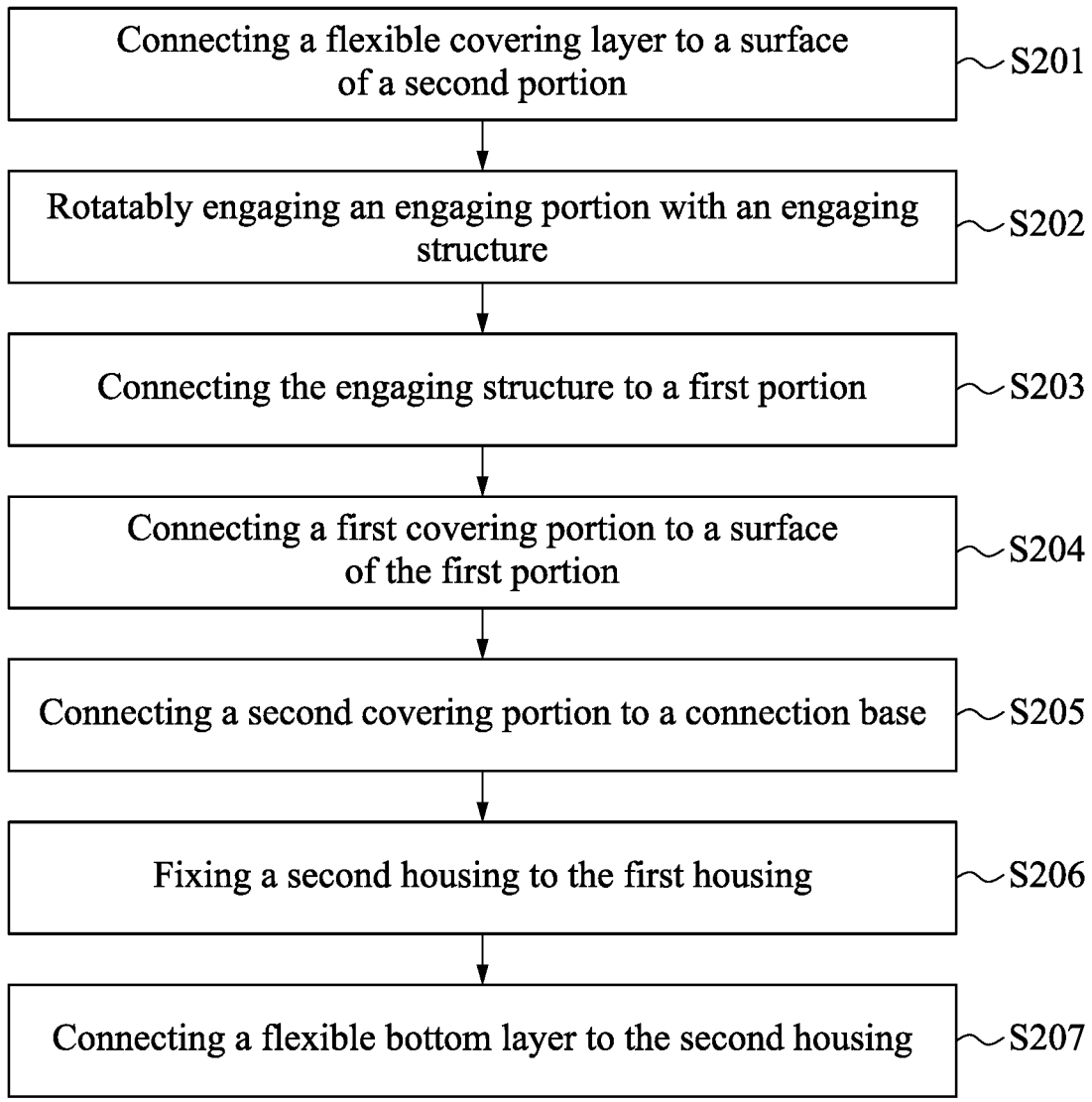
FIG. 9 illustrates a flow chart of a method for assembling a keyswitch device in accordance with another embodiment of the present invention.

FIG. 9 illustrates a flow chart of a method for assembling a keyswitch device in accordance with another embodiment of the present invention. The method shown in FIG. 9 can be more easily understood by referring back to FIG. 8A to FIG. 8E.

Figure 10:
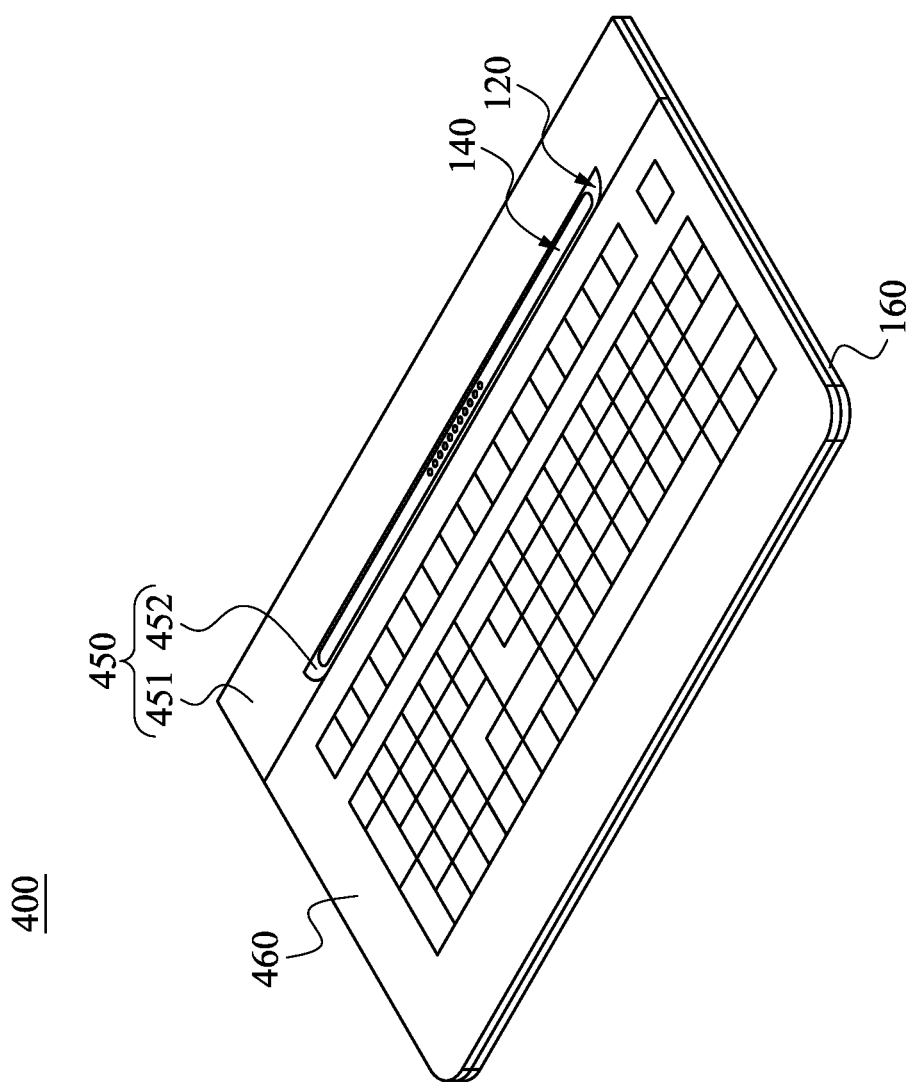
FIG. 10 is a partial perspective view of the keyswitch device shown in FIG. 8E.

Please refer to FIG. 10, which illustrates a partial perspective view of the keyswitch device 400 shown in FIG. 8E. The keyswitch device 400 as shown in FIG. 8E and FIG. 10 can be obtained by performing steps S201 to S207 shown in FIG. 9.

Apparently, from the above description, in the keyswitch device of the present invention, by disposing the engaging structure inside the main body for engaging with the engaging portion, and protruding the engaging structure into the recess of the main body, the problem of the conventional shaft structures exposed outward can be prevented, and thus the texture of the product appearance can be effectively improved. In addition, in the keyswitch device in which the electrical connector is attracted to magnets disposed on an external electronic device, the electrical connection module can establish stable electrical connection with the external electronic device, and the connection base is rotatably engaged with the engaging structure thereby enabling the external electronic device to be rotatable. Moreover, by using this engaging structure, the problem that the flexible covering layer is deformed or peeled off from the main body due to pulling caused by long-term rotation of the connection base relative to the main body can be resolved, in which the connection base is connected to the flexible covering layer.

Though the invention has been disclosed by the above embodiments, the disclosed embodiments are not limited thereto. Any person skilled in the art can make various changes and modifications without departing from the spirit and the scope of the disclosure. Therefore, the protective scope of the disclosure shall be the scope of the claim as attached.

What is claimed is:

1. A method for assembling a keyswitch device, the method comprising:
   providing a first housing, the first housing having a surface and an opening formed on the surface;
   connecting a first covering portion to the surface of the first housing;
   connecting a second covering portion to a connection base of an electrical connector, the connection base comprising an engaging portion;
   rotatably engaging the engaging portion with an engaging structure;
   fixedly connecting the engaging structure to the first housing; and
   fixing a second housing to the first housing such that the first housing and the second housing constitute a recess communicating with the surface of the first housing through the opening, wherein the engaging structure partially protrudes into the recess; and the connection base is received in the recess.

2. The method of claim 1, further comprising:
   connecting a flexible covering layer to the surface to cover the opening; and
   cutting the flexible covering layer substantially along the opening to form the first covering portion and the second covering portion.

3. The method of claim 2, further comprising separating the first covering portion and the second covering portion.

4. The method of claim 1, wherein the first housing comprises a first portion and a second portion, the first portion has the surface, and the connecting the engaging structure to the first housing comprises connecting the engaging structure to the first portion of the first housing.

5. The method of claim 4, wherein the connecting the engaging structure to the first portion is performed before the connecting the first covering portion to the surface.

6. The method of claim 1, wherein the connection base comprises a first cover body and a second cover body, the engaging portion is connected to the second cover body, and the connecting the second covering portion to the connection base comprises:
   connecting the first cover body to the second covering portion; and
   connecting the second cover body to the second covering portion,
   wherein the connected second covering portion is sandwiched between the first cover body and the second cover body.

7. The method of claim 6, wherein the rotatably engaging the engaging portion with the engaging structure is performed before the connecting the second cover body to the second covering portion.

8. The method of claim 1, further comprising:
   connecting a flexible bottom layer to the second housing.

9. The method of claim 1, wherein the engaging portion is a pivot, the engaging structure comprises a hook portion and a fixing portion connected to each other, and the hook portion has a concave surface,
   wherein the rotatably engaging the engaging portion with the engaging structure comprises rotatably engaging the engaging portion with the concave surface,
   wherein the connecting the engaging structure to the first housing comprises fixing the fixing portion to the first housing.

10. The method of claim 1, wherein the engaging portion is a pivot, the engaging structure has an inlet and a shaft hole communicating with each other, the inlet shrinks inward relative to the shaft hole, and the rotatably engaging the engaging portion with the engaging structure comprises pivotally connecting the pivot to the shaft hole through the inlet.

* * * * *